United States Patent [19]

Bass

[11] 4,308,811
[45] Jan. 5, 1982

[54] TWO ROW TREE PLANTER

[76] Inventor: Coleman Bass, Rte. 1, Box 36, Greenville, Ga. 30222

[21] Appl. No.: 175,347

[22] Filed: Aug. 4, 1980

Related U.S. Application Data

[63] Continuation of Ser. No. 968,976, Dec. 13, 1978, abandoned.

[51] Int. Cl.³ .............................................. A01C 11/00
[52] U.S. Cl. ........................................................ 111/3
[58] Field of Search ........................... 111/2, 3, 85, 87; 172/326–328; 280/64, 638, 656

[56] References Cited

U.S. PATENT DOCUMENTS

| | | | |
|---|---|---|---|
| 1,277,228 | 8/1918 | Lisberg | 111/2 |
| 2,620,757 | 12/1952 | Ahlen | 111/3 |
| 2,765,756 | 10/1956 | Webster | 111/3 |
| 3,000,673 | 9/1961 | Lansing | 280/638 X |
| 3,161,163 | 12/1964 | Cosner et al. | 111/3 |
| 3,202,225 | 8/1965 | Richardson | 172/328 |
| 3,261,310 | 7/1966 | Cronk et al. | 111/85 |
| 3,883,153 | 5/1975 | Singh et al. | 280/688 |
| 4,177,743 | 12/1979 | Webster | 111/3 |

FOREIGN PATENT DOCUMENTS

| | | | |
|---|---|---|---|
| 812121 | 8/1951 | Fed. Rep. of Germany | 111/3 |
| 831926 | 2/1952 | Fed. Rep. of Germany | 111/2 |
| 586603 | 12/1958 | Italy | 280/638 |
| 296503 | 4/1971 | U.S.S.R. | 111/3 |

Primary Examiner—James R. Feyrer
Attorney, Agent, or Firm—Newton, Hopkins & Ormsby

[57] ABSTRACT

A simplified low maintenance planter for seedling trees includes rear laterally adjustable wheels which support the body of the planter and also serve to pack the soil around the trees after planting. A pair of coulter wheels slightly forwardly of and laterally inwardly of the packing wheels are toed inwardly and tilted toward the center line of the planter so as to move soil away from the center line of the machine during the formation of two parallel furrows. Workers seated inwardly of the coulter wheels and soil packing wheels take seedling plants from boxes at the interior sides of the worker compartments and place them one at a time in the furrows. The planter is equipped with a hitch mechanism which is operable to elevate the planter body and coulter wheels to a roadway transport position.

2 Claims, 10 Drawing Figures

TWO ROW TREE PLANTER

This is a continuation, of application Ser. No. 968,976, filed Dec. 13, 1978, now abandoned.

BACKGROUND OF THE INVENTION

In recent years, tree planting has progressed from open cultivated fields to cut over timberland. This type of land requires a heavier and more durable planter. Presently available planters can operate on cut over timberland satisfactorily, but the maintenance and down time involved is practically prohibitive.

Previous machines for planting seedlings have used various implements which furrow the soil subterraineously and deposit soil mounds on the top soil at each side of the furrow. After placing a seedling therein, these mounds are pushed by juxtaposed packing wheels diagonally and downwardly toward the opening. This type of planting leaves a small crevice down the center of the furrow with packed mounds of soil at each side. It is for this reason that when planting on a downwardly sloped field or cut over timberland that great attention must be given to the direction of travel of the tree planter, for if the furrow lines of a conventional planter are not perpendicular to the slope line, rainfall may wash out the freshly planted seedling along with the resultant possibility of severe soil erosion.

It therefore is an object of the present invention to provide an opening cut in the soil for placing a seedling, whereby upon closing by a single packing wheel with a downward force, the topography of the soil is essentially maintained as it was before it was disturbed. The inwardly toed and tilted coulter wheels of the present invention provide a rudder-like means for maintaining selected directional travel of the planter, thereby maintaining the desired soil topography.

Another object of the invention is to provide a tree planter of sufficient weight and ruggedness to operate on all types of land including cut over timberland in a practically maintenance-free manner and with great efficiency in the planting of seedling trees in twin rows. The machine is sufficiently heavy to withstand the rigors of the operation and is greatly simplified in construction for the sake of economy of manufacturing as well as low maintenance.

While machines for planting seedling trees are known in the prior art, such machines do not possess the attributes and capabilities noted above for this invention and it is believed that the invention is a significant advance in the art. The following known prior patents are made of record herein under 37 C.F.R. 1.56:

U.S. Pat. Nos.: 2,103,588, 2,316,397, 2,444,575, 3,261,310, 3,613,801, 3,643,611, 3,747,422 3,815,542, 4,026,225.

SUMMARY OF THE INVENTION

A planter body is supported at its rear by two widestance independently laterally adjustable wheels which also serve to close and pack the soil over two parallel tree planting furrows which are produced by two toed in and tilted coulter wheels slightly in advance of and laterally inwardly of the two rear wheels and being attached to the planter body. Two compartments for seated workers near and inwardly of the coulter wheels communicate with tree boxes or containers near the center of the body, whereby the seated workers take seedling trees from the boxes and place them, one at a time, in the furrows through openings in the body immediately rearwardly of the coulter wheels. Two rows of seedling trees are thus continuously planted and their furrows are closed as the operation proceeds. The front of the planter body carries a power-operated hitch including a tongue which can be depressed to raise the front of the planter to a roadway transport position.

The tree planter of the present invention accomplishes planting in a manner that prevents soil erosion in that the planter slices a trench which opens the soil for receiving the trees and the wheels put back the soil without producing a furrow which could cause soil erosion. The present planter is capable of operating up and down a hill and requires less than half the horse power per acre required for operating conventional planters.

DETAILED DESCRIPTION

Figure 2:
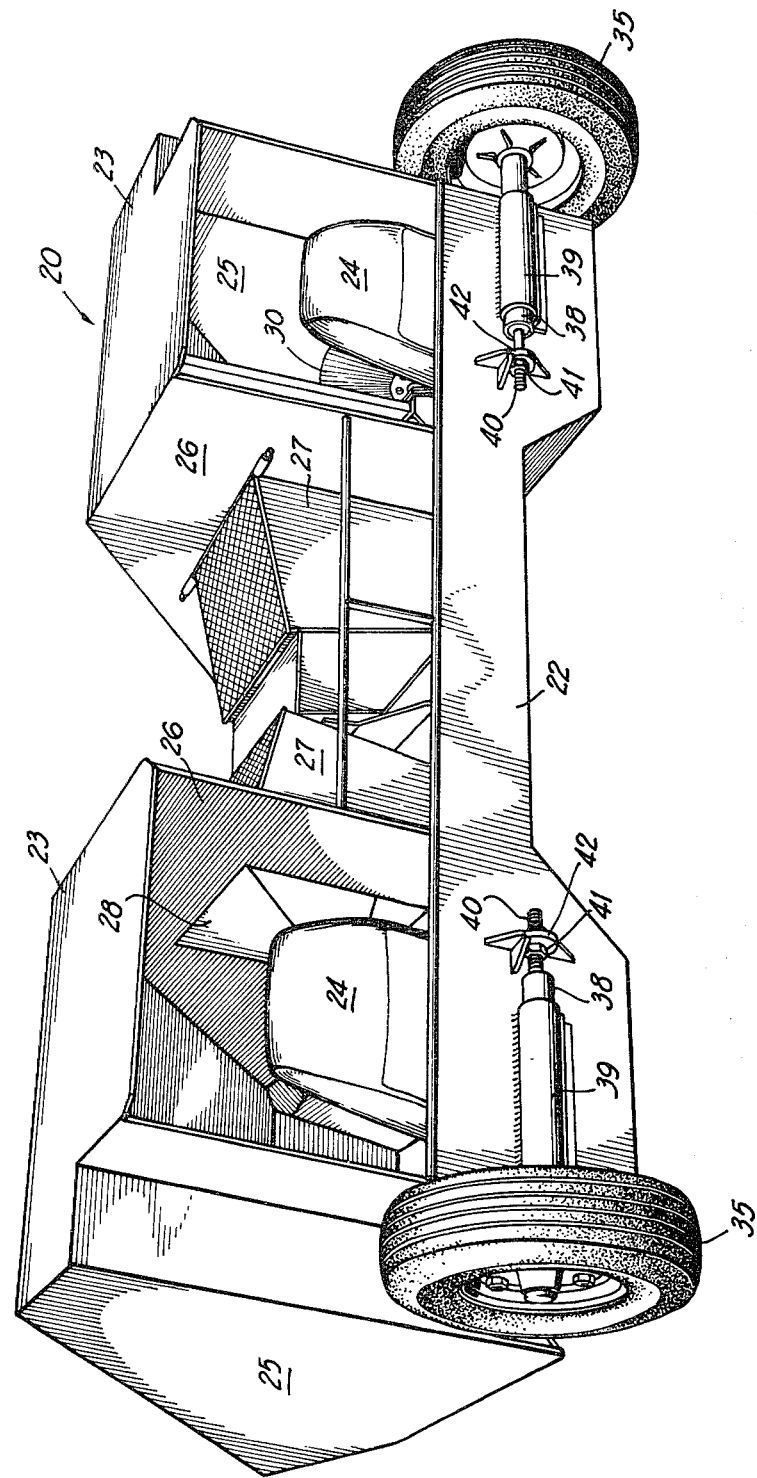
FIG. 2 is a rear perspective view of the planter.

Referring to the drawings in detail wherein like numerals designate like parts, a two row planter for seedling trees possesses a body 20 preferably welded as a unit from suitable plate stock to provide the necessary weight for operating on cut over timberland. The welded body 20 includes a floor 21, a comparatively low rear wall 22, and two box-like worker compartments 23 of sufficient height and breadth to comfortably accommodate two workers seated on chairs 24 suitably attached to the floor 21. Preferably, the enclosures 23 are forwardly tapered, as illustrated, with vertical outer and inner side walls 25 and 26, the rears of the two worker compartments being open, as shown in FIG. 2.

Figure 5:
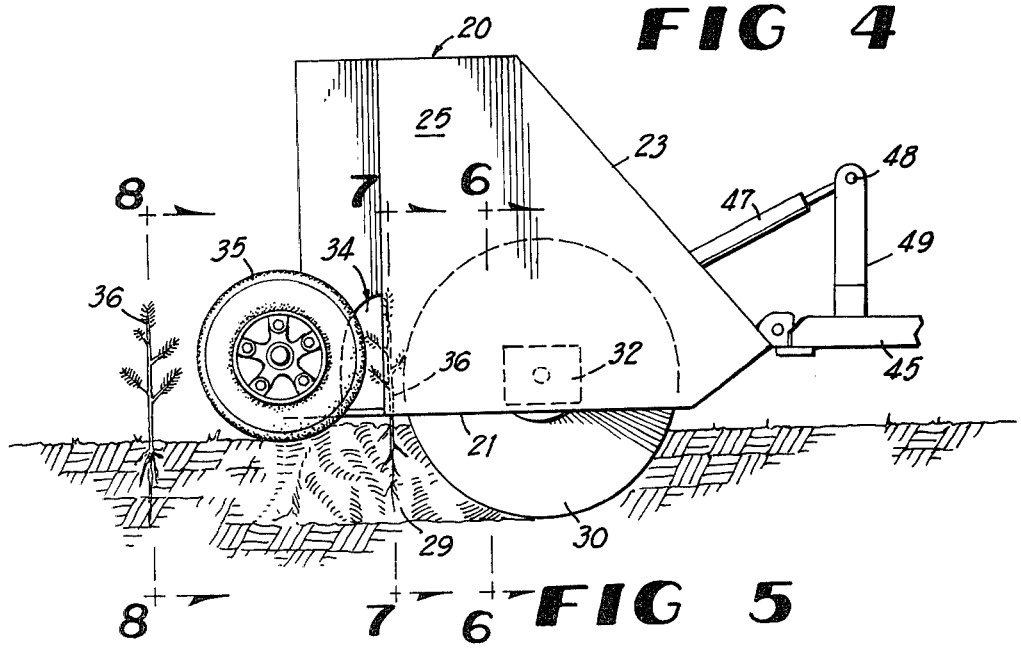
FIG. 5 is a side elevation of the tree planter during usage with the hitch adjusted to the planting mode.
Figures 6, 7, 8:
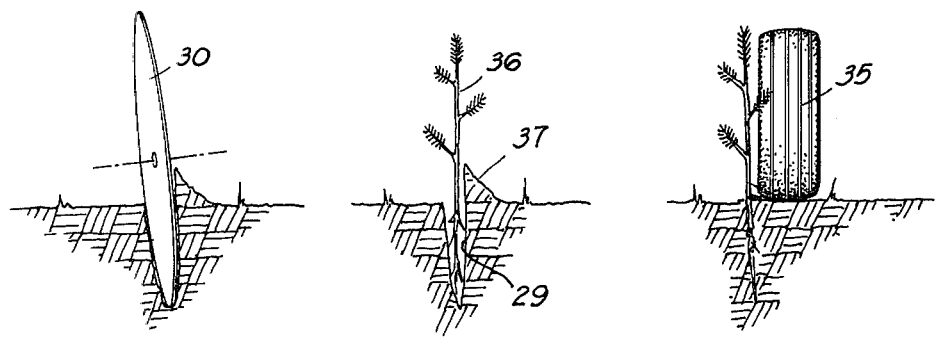
FIGS. 6, 7 and 8 are partly diagrammatic transverse cross sections taken, respectively, on lines 6—6, 7—7 and 8—8 of FIG. 5.

Seedling tree supply boxes 27 are disposed inwardly of the compartments 23 and communicate therewith through access openings 28 in the side walls 26, so that the workers can lift trees from the boxes 27 and place them, one at a time, in planting furrows 29, FIGS. 5 and 7, formed by coulter wheels 30, to be further described.

Figure 3:
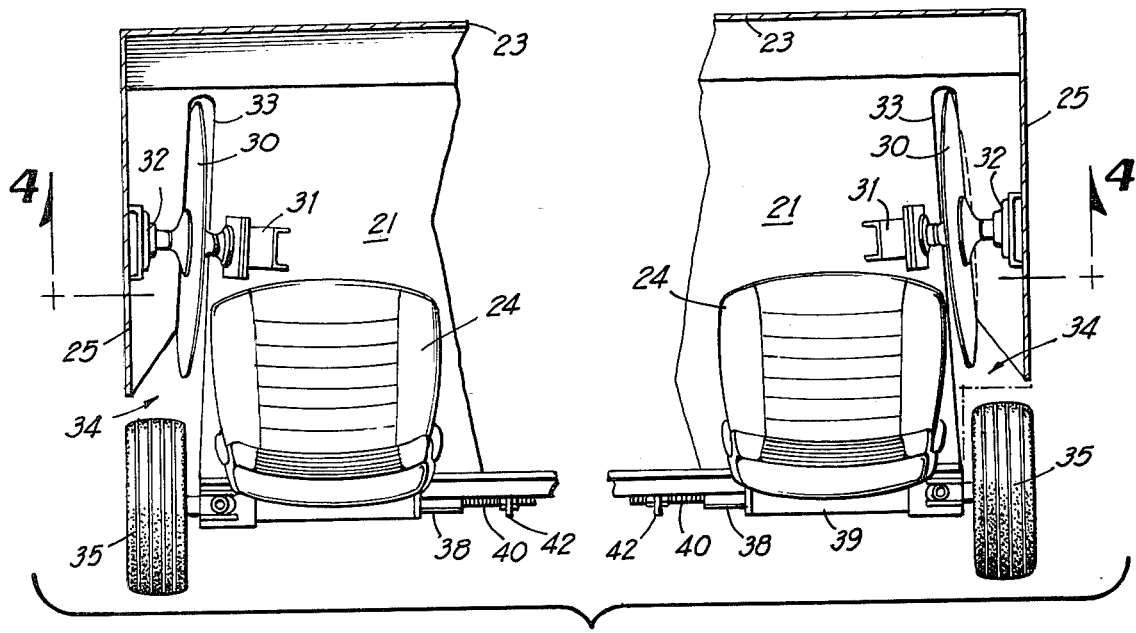
FIG. 3 is a fragmentary plan view of the planter, partly in section.
Figure 4:
FIG. 4 is a fragmentary transverse vertical section taken on line 4—4 of FIG. 3.

The coulter wheels 30 form rather critical elements of the invention necessary for the continuous two row planting of seedling trees. The coulter wheels 30 are preferably about 29 inches in diameter and are rigidly supported by bracket means 31 attached to the floor 21 and bearings 32 attached to the side walls 25. The coulter wheels are toed inwardly about one to two inches from true vertical planes and are also tilted inwardly at their tops about the same distances relative to true vertical planes. The toed in arrangement of the coulter wheels 30 is shown in FIG. 3 and the tilted in arrangement is shown in FIG. 4. The furrow-forming coulter wheels 30 project through two slots 33 formed through the floor 21 of the machine, the rear ends of these slots communicating with relatively large tree placement openings 34 in the floor 21 near the sides of the seats 24 and immediately ahead of two widestance rear wheels 35 which support the rear end of the planter.

The rear wheels 35 and their adjustable mounting form another important feature of the invention. As depicted in FIGS. 6, 7 and 8, the coulter wheels 30 form the two furrows 29 in which the seedling trees 36 are planted, and the rear wheels 35 following the coulter wheels close the furrows by continuously packing down the mound 37 of soil produced when the furrows are open. It should be stated that the toed in and tilted coulter wheels 30 move the soil outwardly and away from the longitudinal center line of the planter during its movement to produce furrows 29 of the required depth and width and to form the mounds 37 on the outer sides of the coulter wheels, and in alignment with the following soil packing wheels 35. Thus, the wheels 35 perform two functions in the invention, namely, supporting the rear of the planter and the packing down of the soil mounds 37, as shown in FIG. 8.

To assure accurate alignment of the wheels 35 with the mounds 37 and accurate positioning of the wheels laterally in relation to the coulter wheels 30, means are provided to adjust each wheel 35 independently laterally on the planter. Such adjusting means comprises an inner wheel axle element 38 mounted telescopically in a transverse axis sleeve 39, welded or otherwise fixed to the rear wall 22 of the planter body. The axle element 28 for each wheel has an adjusting screw-threaded extension 40 fixed therethrough and engaged by adjusting and locking nuts 41 on opposite sides of a fixed plate 42 rigid with the rear wall 22. The arrangement allows each support and soil packing wheel 35 to be finely adjusted laterally in relation to the adjacent coulter wheel 30, for the reasons specified.

Figure 9:
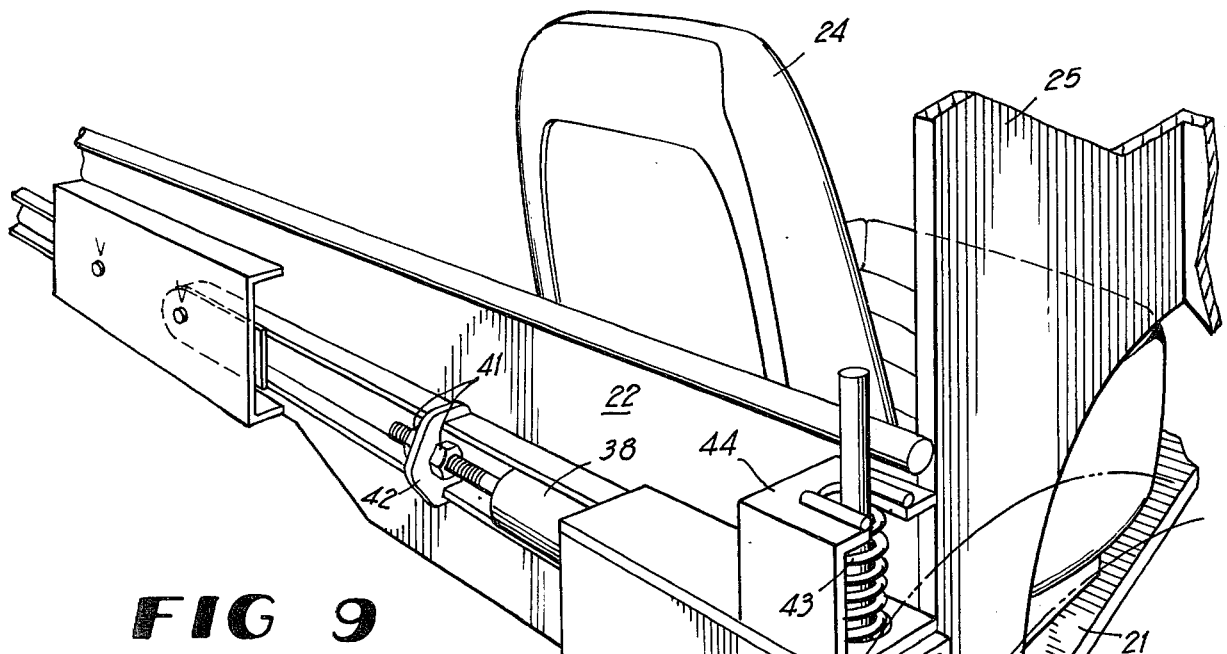
FIG. 9 is a fragmentary perspective view of wheel adjusting and spring suspension means for the planter.
Figure 10:
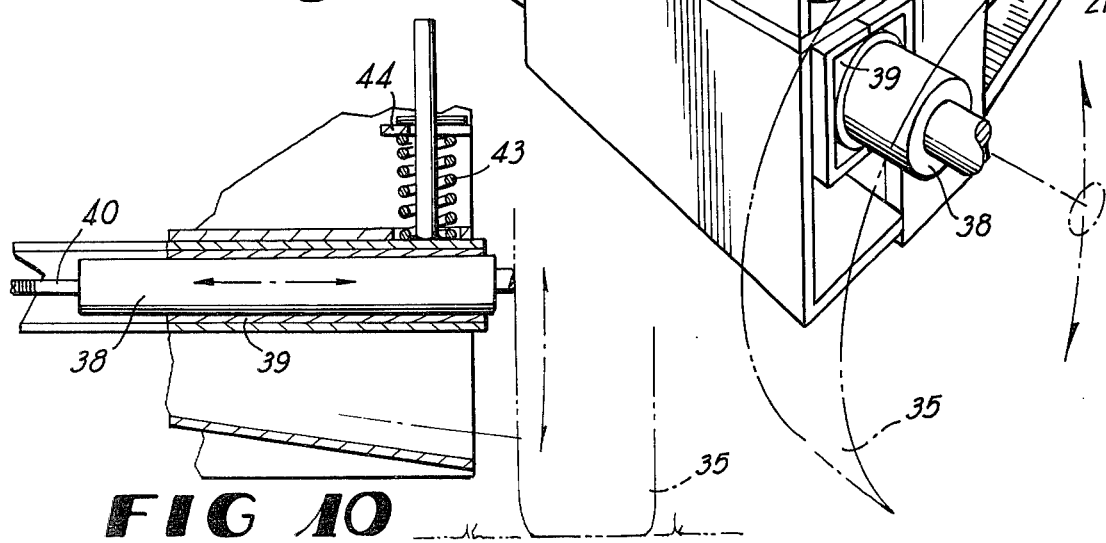
FIG. 10 is a fragmentary vertical section through the wheel adjusting and suspension means.

Preferably, the rear of the planter has compression spring suspension means 43 on opposite sides thereof, FIGS. 9 and 10, which cushion the operation of the machine and are provided primarily for enabling the packing wheel 35 to maintain a pressure sufficient to repack the furrow in the event that the main body, which rides close to the ground is pulled over a stump or large rock and the body of the planter 20 is disposed above its normal plane during planting. The spring means 43 bear on the rear axle structure, FIG. 10, and on a box structure 44 fixed to the rear wall 22. Other types of spring suspensions may be utilized, if desired, or the spring suspension means may be omitted entirely as indicated in FIG. 2 of the drawings.

Figure 1:
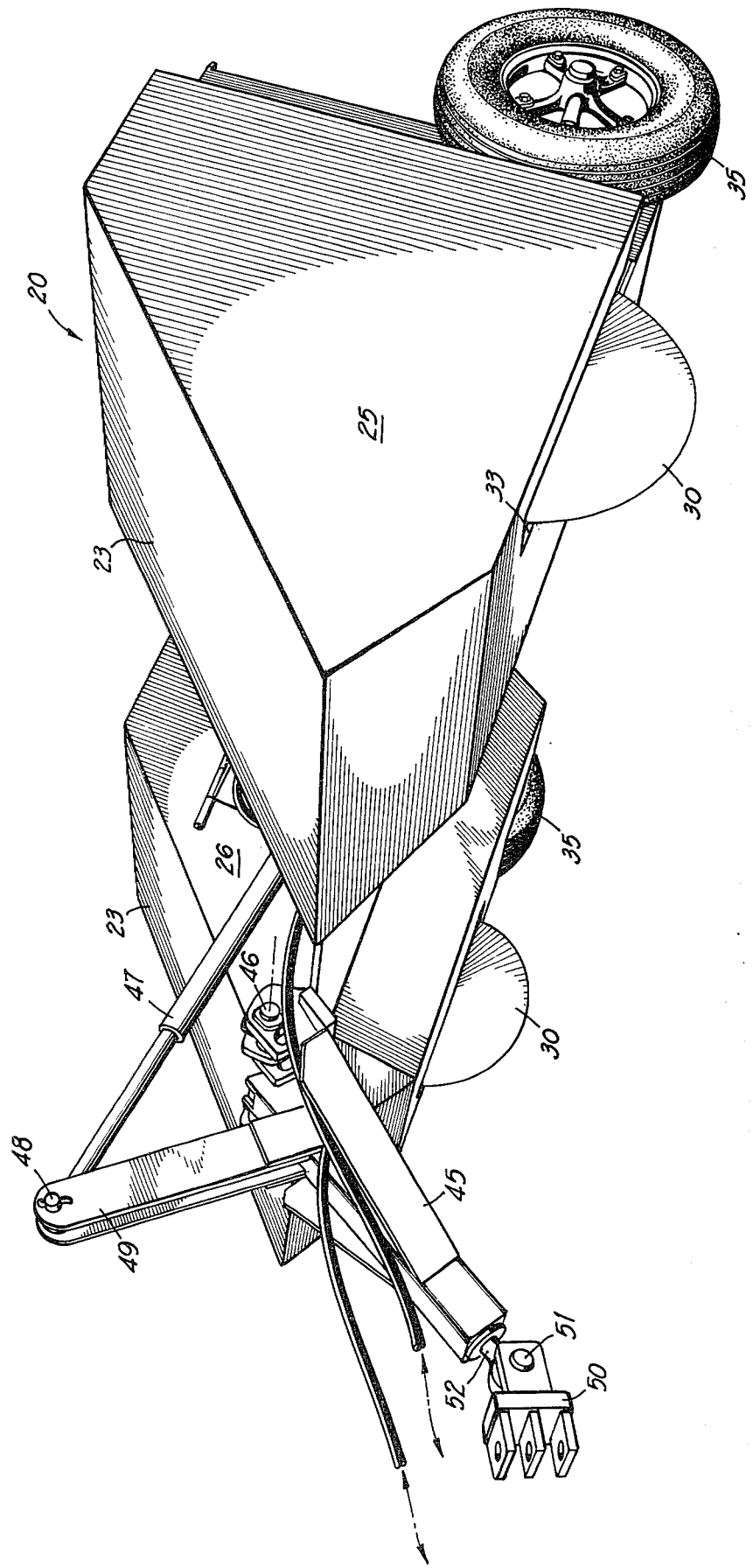
FIG. 1 is a front perspective view of the tree planter in a roadway transport mode.

A further feature of the invention resides in the provision of a power adjustable hitch mechanism in front of the planter and at its traverse center including a draft tongue 45 pivoted at 46 to the planter body for vertical swinging downwardly or upwardly at proper times under the influence of an extensible and retractable power cylinder unit 47 coupled between the planter body and a top pivot element 48 of a rigid post extension 49 on the tongue 45. When the cylinder 47 is extended, as in FIG. 1, the draft tongue 45 is depressed and the front end of the planter is lifted to raise the coulter wheels 30 above the ground so as to condition the planter for roadway transport behind a towing vehicle. When the cylinder unit 47 is retracted, FIG. 5, the tongue 45 will be level and the coulter wheels 30 will be in their active furrow-forming positions below ground level with the rear wheels 35 rolling on the ground to continuously pack the mounds 37 and close the two furrows 29, as previously described. The floor 21 will also be level at this time.

At its forward end, the tongue 45 carries a three level coupler 50 compatible with tractor drawbars of different heights, the coupler 50 being freely pivoted on a cross pin 51 and also being freely swiveled on the axis of a longitudinal pin 52 carried by and extending rearwardly of the cross pin 51 and suitably journaled in the forward end of the draft tongue 45. The coupling 50 is thus universally swiveled to the front of the vertically swingable tongue 45.

SUMMARY OF OPERATION

With the tongue 45 adjusted as in FIG. 5 by the cylinder unit 47 to place the planter in the normal operating mode, the planter is drawn forwardly over a field or over cut over timberland, as the case may be. During such movement, the two coulter wheels 30 will continually open two parallel furrows 29 and the two workers on the seats 24 will take seedling trees 36 from the boxes 27 and pass them through the floor openings 34 into the furrows 29. Immediately following this, the oncoming previously-adjusted rear wheels 35 will continuously close the two furrwos 29 by rolling over and packing down the soil mounds 37 which have been forced to the outer sides of the furrows and away from the center line of the planter by the action of the toed in and tilted coulter wheels.

The planter is characterized by simplicity of construction, extreme ruggedness and durability, resulting in minimum maintenance and reliability of operation. The planter is sufficiently massive to operate well on cut over timberland where much present-day new tree planting is taking place. The advantages of the machine over the known prior art should now be readily apparent to those skilled in the art.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A tree planter comprising a planter body having a floor and a pair of laterally spaced worker compartments on the floor each containing a protected worker seat, supply containers for seedling trees on the floor of the planter body between the worker compartments and being accessible to workers on said seat, a pair of support wheels on the rear of the planter body including axles which are extensible and retractable and swingable in a vertical plane, spring means to resist vertical swinging of the axles in one direction, a single pair of flat furrow opening discs on the planter body slightly forwardly of said seats and slightly laterally inwardly of said rear support wheels and being the sole furrow forming means of the planter, support means for said discs on said floor and said floor being provided with slots through which the discs project downwardly below the floor, the discs being toed inwardly toward the longitudinal center line of the planter and being tilted laterally with their tops displaced toward the center line, whereby the discs upon opening furrows during forward movement of the planter force a ridge of soil laterally outwardly of the furrow and said wheels following the discs roll over said ridge, and an adjustable hitch of the vertically swinging type and having power operating means on the front of the planter whereby said discs can be raised and lowered relative to said wheels.

2. A tree planter as defined in claim 1, and said wheels including screw-threaded lateral adjusting means whereby the wheels are positionable laterally independently with precision so that their paths of travel will be directly over the soil ridges produced by the furrow opening discs.

* * * * *